Patented Dec. 15, 1931

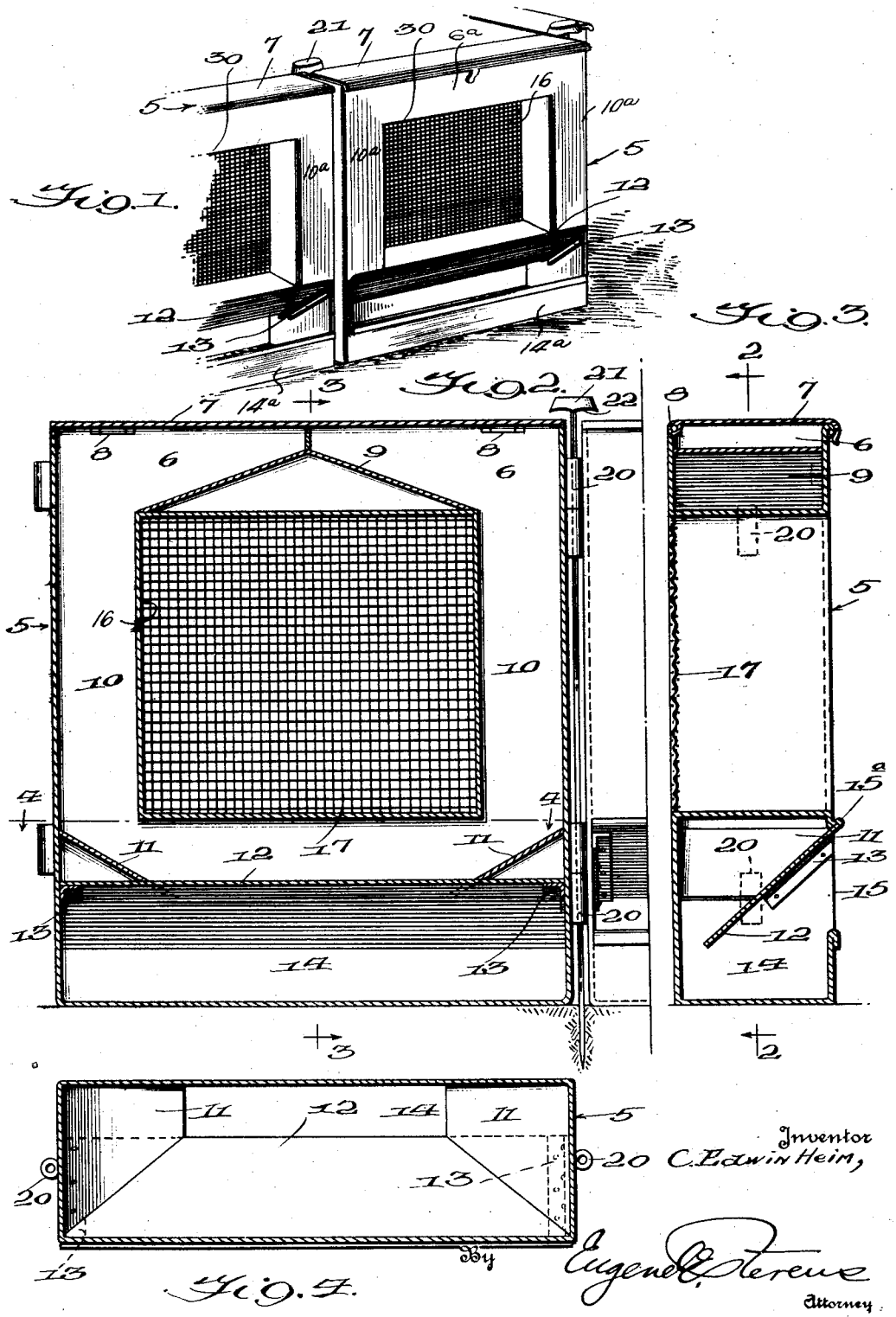

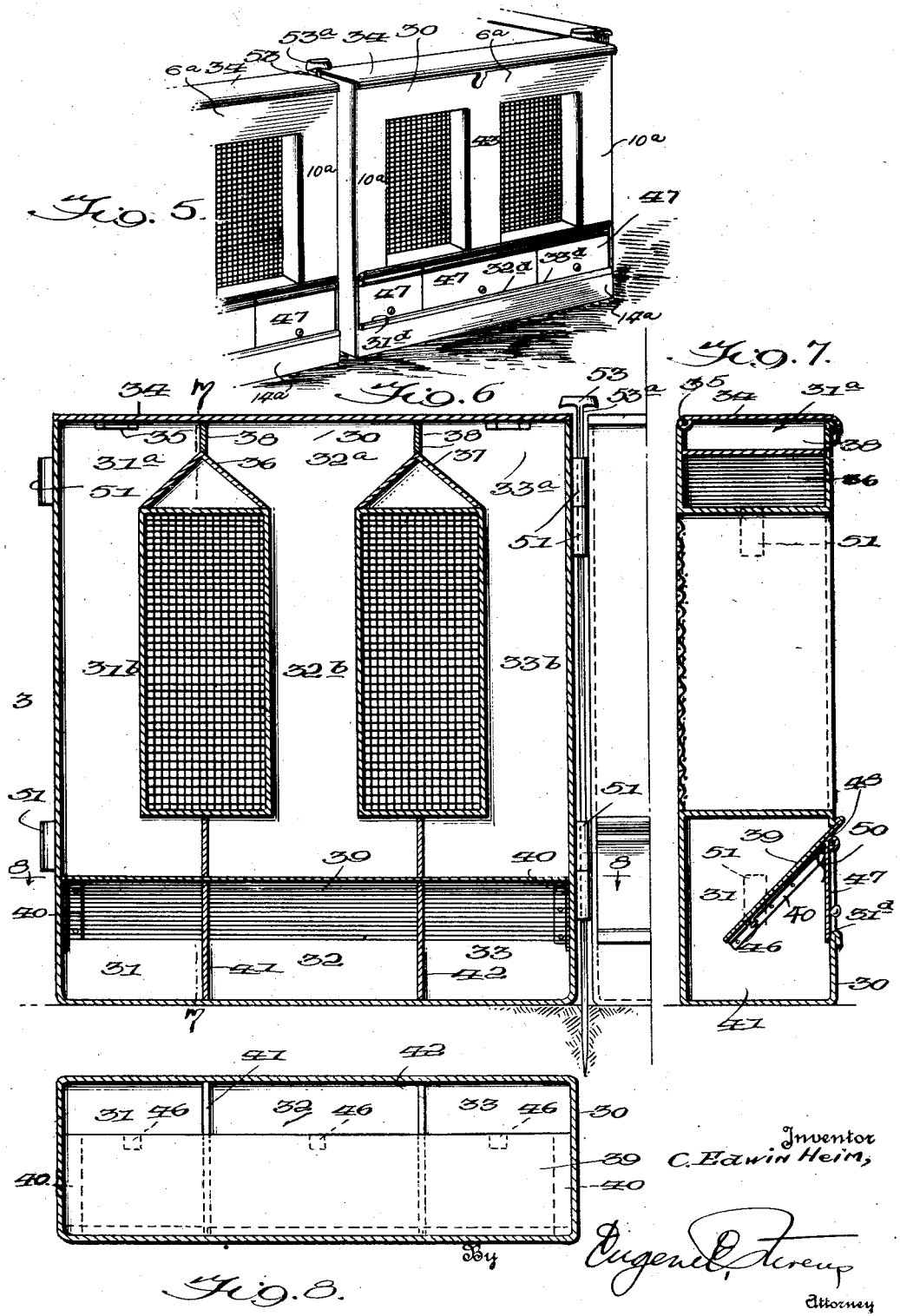

1,837,044

UNITED STATES PATENT OFFICE

CHARLES EDWIN HEIM, OF KENSINGTON, MARYLAND

COMBINED POULTRY FENCE AND FEEDER

Application filed January 22, 1930. Serial No. 422,612.

My invention relates to fences or enclosures for poultry and has for its primary object to provide a novel and improved device of this character which incorporates self-contained feeding means.

Another object of the invention is to provide a novel knock-down fence or enclosure which embodies a plurality of separably connected sections and combined connecting and anchoring means therefor.

The invention also contemplates the elimination of separate feeders and watering receptacles in the chicken yard, thus, giving the chickens more room and obviating the likelihood of the receptacles being tipped over.

A further object of the invention is to provide a novel poultry enclosure or fence which can be arranged in any form or outline to meet the needs in a given instance.

The invention also contemplates a device, as characterized, which will be very simple in construction, economical to manufacture in that it may be made out of stampings, and which will be highly efficient in practical use.

The invention also resides in certain novel features of construction, combination and arrangement of the various parts and in modes of operation and use, all of which will be readily apparent to those skilled in the art upon reference to the accompanying drawings in connection with the detailed description following hereinafter.

It is to be understood that the drawings illustrate what now appears to be a preferred form of the invention. However, the invention is capable of other mechanical expressions within the spirit and scope of the subject matter claimed hereinafter.

In the drawings,

Figure 1 is a fragmentary perspective view illustrating a portion of a fence embodying my invention;

Figure 2 is a central vertical longitudinal sectional view through one of the fence sections and showing the feeding compartment and passageways in addition to the hinge connection between an adjacent section, this view being taken on the line 2—2 of Figure 3;

Figure 3 is a cross sectional view taken on the line 3—3 of Figure 2;

Figure 4 is a horizontal sectional view taken on the line 4—4 of Figure 2;

Figure 5 is a fragmentary perspective view along the line of Figure 1, but showing a modified form of the invention;

Figure 6 is a central vertical longitudinal sectional view through one of the sections of the fence shown in Figure 5;

Figure 7 is a vertical sectional view taken on the line 7—7 of Figure 6; and

Figure 8 is a cross sectional view taken on the line 8—8 of Figure 6.

Referring specifically to the drawings, wherein the same reference characters have been used to designate the same parts in all views,—the fence or enclosure preferably comprises a plurality of sections which are generally designated as at 5, and which comprehend frame-like members having a top rail $6^a$ providing a feed supply chamber, as indicated at 6, which is adapted to be closed by means of a closure 7 which is hinged to the sections, as indicated at 8.

It will be observed that the sections 5 comprise top rails $6^a$, bottom rails $14^a$ and vertical end rails $10^a$. Between these rails is an open space 16 closed only by wire 17 so as to let air and light through the section.

In order that the feed may be supplied to the top rail feed receiving chamber 6 and distributed toward each end, I provide the V-shaped deflector 9 which is carried by the front and rear walls of the feed chamber and which deflects the feed laterally toward the vertical passages 10 through which the feed passes downwardly upon the end deflectors 11. As shown, the passages 10 are provided in the vertical end members $10^a$ of the frame or section 5. One end of each deflector rests against the outer side wall of its passage 10, while the other end is supported upon the inclined panel 12, the ends of which are supported by the cleats 13 carried by the end walls of the feeding chamber 14 which, as clearly shown in Figure 3, has the frontal feeding opening 15. As will be noted the feeding chamber 14 is provided by the lower horizontal rail 14ª of the fence section 5,— the rails 10ª and 14ª being in spaced superposed relationship to one another. It is particularly noted in Figure 3 that the lower edge of the inclined panel 12 extends below the plane of the lower edge of the feeding opening 15. Thus, the feed will be continuously replenished in the feeding chamber 14 as it is used and a substantially constant amount of feed maintained therein at all times. Obviously liquid or solid feed to be supplied to the feed chamber according to the whim of the poultryman in a particular case.

As has been previously stated, each of the sections 5 is constructed after the fashion of a frame and from the description up to this point it will be clear that the side members of the frame provide the passages 10 disposed at either side of the central openings 16, which is preferably covered by a reticulated screen 17 which may be secured to the exterior surfaces of the supply and feeding chambers 6, 14, as best illustrated in Figure 3.

Of course, the forward edges of the deflectors 11 will reach substantially to the front walls of the feeding chamber at each corner thereof, and Figure 3 shows that the upper edge of the opening 15 may have a lip, as indicated at 15ª, about which the crimped end of the panel 12 may be bent to effect a tight seal at this point which is particularly necessary where the feed is in a fluid or semi-fluid.

The sections are each provided with a sleeve-like hinge element of which there are two at each end, as best shown in Figure 2. These hinge elements are designated as at 20 and those at one end of a section 5 are disposed in a plane inwardly of those at the other end so that the sleeve-like portions may be disposed one beneath the other when the sections are brought into end to end relationship. A pin 21 having a finger grip head 22 is adapted to be passed through the alined sleeve of the adjacent section and such pin 20 is of a length sufficient to enable its end to be projected into the ground as shown in Figure 2, so that the pin 20 in addition to connecting adjacent sections 5 also serves to anchor the assembled sections to the ground so that the fence will not be knocked over by the chickens or other poultry and so that the predetermined outline of the fence or enclosure will be at all times preserved and further so that the device will have sufficient stability to enable the larger fowls to roost thereon. This is particularly of advantage where the fence is employed for chicks in the usual poultry yard.

The lip 15ª which is illustrated in Figure 3 and which has been referred to hereinbefore may be arranged on a slight incline with respect to the horizontal bottom edge of the feeding compartment 14 so as to serve after the fashion of a gutter or drain so that water coming in contact therewith from above will drain off and not enter the feeding chamber in the event that the joint between the panel 12 and the lip 15ª is not perfect.

Referring to Figure 5, it will be seen that I have disclosed a modified form of the invention which differs from the disclosure in Figure 1, particularly in that each of the sections 30, as shown in Figure 5, provide a plurality of feed compartments 31, 32, 33, as shown in Figure 6.

Turning particularly to Figures 6 and 7 it will be observed that the upper portion of each of said sections 30 has a feed receiving portion divided into three chambers 31ª, 32ª, 33ª, which are in communication with the feeding chambers 31, 32, 33, by means of the passages 31ᵇ, 32ᵇ, 33ᵇ, as shown.

I have disclosed a hinged closure 34, which is pivoted to the sections 30, as indicated at 35, and which is adapted to close the several receiving compartments hereinabove referred to. V-shaped deflectors 36, 37, are disposed beneath the partition elements 38 which separate the feed receiving compartments 31ª, 32ª, 33ª, from one another,—it being observed that such partitions engage the V-shaped deflectors at the apices thereof. Thus, feed which is disposed in the compartment 33ª will be deflected by the right hand side of the V-shaped deflector 37 to pass into the passageway 33ᵇ and down into the right hand feeding chamber 33, as disclosed in Figure 6.

Here, as in Figures 1 and 2, there is provided a deflector panel 39 which extends across the whole width of the sections 30 immediately above the feeding chambers. This panel 39 may be supported by cleats 40 at the ends thereof and also by the partitions 41, 42, which divide the bottom of the section into the feeding chambers 31, 32, 33.

Figure 5 considered in connection with Figure 6 clearly shows that the side members of the frame 30 are hollow in form to provide the passages 31ᵇ, 33ᵇ, herein referred to,— while the central passage 32ᵇ is formed by the hollow vertical post which is disposed intermediate the ends of the sections and which for purposes of convenience has been designated as at 43.

Referring to Figure 7 it will be noted that the bottom edge of the panel 39 has a plurality of lips or flexible latch elements 46 which are adapted to engage and hold the lower edge of closure elements 47 which are hinged as at 48 to the front wall of the sections 30,—there being a plurality of closures 47,—one for each of the feeding chambers 31, 32, 33. The closures 47 are normally held in the positions shown in Figure 7 to close the feeding openings 31ᵈ, 32ᵈ, 33ᵈ, by means of the leaf springs 50 one of which is shown in Figure 7 as being carried by the panel 39 and bearing against the closure.

The form of invention shown in Figures 5, 6, and 7 incorporates the sleeve keepers 51 at each end which have been described in connection with the construction shown in Figure 1 and which are adapted to receive the securing and anchoring pins 53 having the finger grip heads or ends 53ᵃ.

As will be noted the flat head of the hinge pin is convenient for hammering the same into the ground and the finger grip for easy pulling out. However, when the poultryman wishes to use the fence upon a hard surface an ordinary short bolt can be placed in the sleeve-like hinge elements.

Where long enclosures are necessary it will be advisable to insert between the sections of the fence, sections with no feeding means incorparated therein, thus keeping the cost of the fence down.

Having thus described my invention, what I claim as new and desire to secure by Letters Patent is:

1. The combination in a fence section of a rail providing a feeding chamber.

2. The combination of a fence section having superposed rails, of a feeding chamber located in one rail, a feed supply chamber located in a superposed rail, and a supply conduit extending from said supply chamber to said feeding chamber.

3. The combination of a fence section comprising a frame having upper and lower rails and vertically disposed spacing rails, the upper rail having a feed supply chamber therein and the lower rail having a feeding chamber, and the vertical members providing connecting conduits between said supply and feeding chambers.

4. The combination of a fence section comprising connected sections having spaced horizontal frame members, one of said frame members having a feeding chamber therein and a superposed frame member having a feed supply chamber, means for supplying feed from said supply chamber to said feeding chamber, and closures for said feed and supply chambers.

5. A poultry fence adapted to form an enclosure and comprising a plurality of separate sections each having base and top chambers and a connecting conduit communicating therebetween, said base chamber having a feeding opening in one side and the top chamber having a feed receiving opening, and deflector means in said base chamber for diverting feed from said conduit away from said feeding opening.

6. A poultry fence adapted to form an enclosure and comprising a plurality of separate sections each having base and top chambers and a connecting conduit communicating therebetween, said base chamber having a feeding opening in one side and the top chamber having a feed receiving opening, alignable bearing portions at the ends of said sections.

7. A poultry fence adapted to form an enclosure and comprising a plurality of separate sections having chambered base portions providing feeding chambers, said chambers having feeding openings in one wall, each section incorporating a top feed supply chamber and a communicating conduit between the same and said feeding chamber, a deflector in said supply chamber for directing the feed toward said conduit, and a deflector in said feeding chamber opposite said feeding opening and extending inwardly and downwardly from the wall above said feeding opening to a point below the plane of such opening and adjacent the opposite wall of said feeding chamber.

8. A poultry fence section including a frame having chambered top and bottom members and connecting members for said top and bottom members providing passages communicating between the chambers thereof, and said top and bottom member chambers having a feed receiving and fowl feeding openings, respectively.

9. A poultry fence section including a frame having chambered top and bottom members and connecting members for said top and bottom members providing passages communicating between the chambers thereof, said top and bottom chamber members having a feed receiving and fowl feeding openings, respectively, and coupling means associated with said section.

10. A poultry fence section including a frame having chambered top and bottom members and connecting members for said top and bottom members providing passages communicating between the chambers thereof, said top and bottom member chambers having a feed receiving and fowl feeding openings, respectively, and a reticulated screen supported by said top, bottom and connecting members and covering the space between the same.

11. A poultry fence section including a frame having chambered top and bottom members and connecting members for said top and bottom members, said connecting members providing passage communicating with said top and bottom chambers, partition members in said top and bottom chambers and dividing the same into a plurality of substantially corresponding supply and feeding bins, respectively, there being a connecting conduit-providing member for corresponding supply and feeding bins, deflector means in said top chamber for directing the contents of said supply bins to their respective conduits, removable closure means for said top chamber, said bottom chamber having fowl feeding openings in one wall and opposite each of its bins, an inwardly opening closure for each of said feeding openings and means for holding said feeding opening closures in open position.

In testimony whereof I affix my signature.

CHARLES EDWIN HEIM.